Dec. 19, 1939.    A. R. WELCH    2,183,599
PROCESS OF MAKING PANELS
Filed Feb. 1, 1937
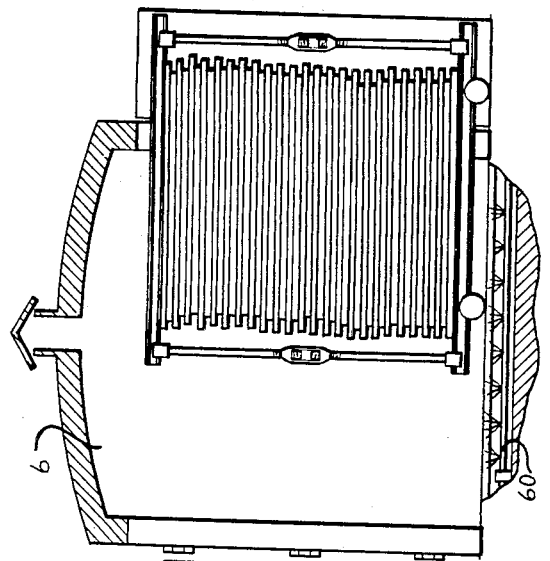
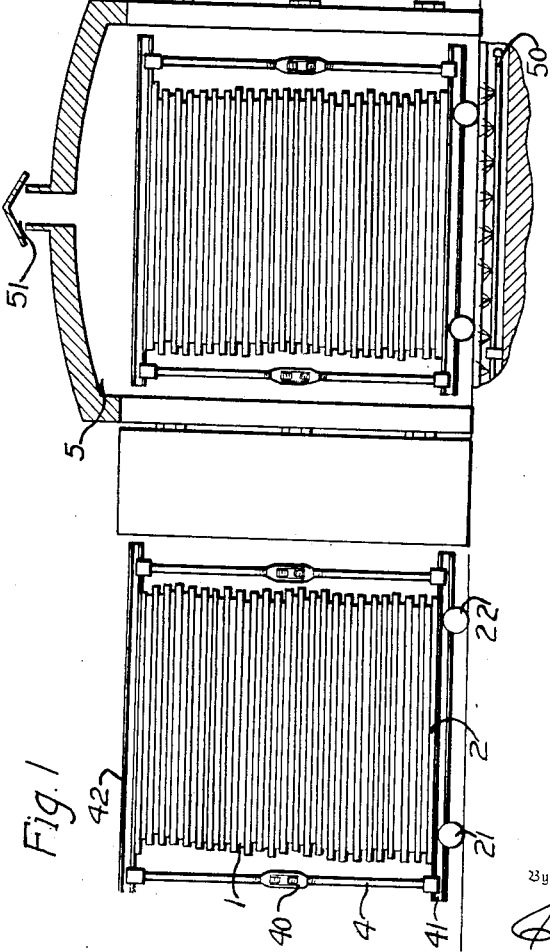
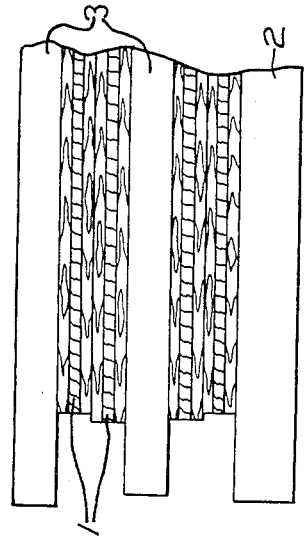
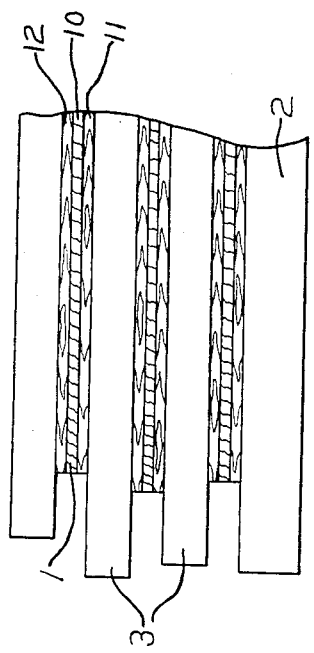
Inventor
Arthur R. Welch
By Charles L. Reynolds
Attorney Patented Dec. 19, 1939

2,183,599

UNITED STATES PATENT OFFICE 2,183,599

PROCESS OF MAKING PANELS

Arthur R. Welch, Hoquiam, Wash.

Application February 1, 1937, Serial No. 123,551

1 Claim. (Cl. 144—309)

My invention relates to the manufacture of panels from materials and with a binder, such as a resin, which sets under heat and pressure. For example, panels may be made up by this process with faces of wood veneer, and with a core of appropriate material, usually veneer, using a suitable resin binder between the plies.

Plywood has been manufactured heretofore using such binders, but because it is necessary to apply considerable pressure and heat to effect setting of the binder (and of course the heat must penetrate the face of the panel to heat the binder, or in the case of five-ply panels, must penetrate two such veneer sheets) the necessary heat and pressure have been applied to the panel through the medium of specially built presses, usually incorporating heavy press plates which have interior passages for hot air or steam, or which have incorporated within them electrical heating elements. Such presses are large, heavy and very expensive, and it is not economically practicable to hold the panels for any considerable period of time in such presses. Sufficient heat, or a sufficiently high temperature, is employed that the panels will heat through quickly (though a lower temperature would be preferable), the presses are then opened, and the pressed panels are removed and set aside to cool.

This produces undesirable results. The panels contain a certain amount of moisture, and in fact must contain an appreciable moisture content or, being brittle from its lack, they crack easily, and are difficult to handle. When subjected to the rather intense temperature of the presses the panel is raised in temperature considerably above the boiling point of water, and the moisture within the panels is converted into steam. This steam cannot readily escape from the panels while they remain under pressure, but upon relief of the pressure the moisture is immediately converted into steam, and at the least leaves the panel, rendering the finished panel brittle, and tending to shrink it or check it locally. But it frequently collects in interstices or pockets, and upon relief of the pressure produces a bulging of the panel, either rendering the panel unfit for use or necessitating a considerable amount of sanding down, and leaving the plies separated, and not firmly glued together. Furthermore, because of this tendency of the steam to collect in pockets, care must be taken in laying up the panels that there are no interstices or voids which may become focal points for such steam pockets. The core of a plywood panel may readily be made up of an inferior grade of veneer, since it is not seen in use, yet it is amply strong enough. Such inferior grade of veneer may have cracks, knot holes, and the like. In using nonresinous glues the core can be laid up of separate pieces, merely placed edge to edge in the process of laying up the panel, but to thus lay up the core, when using a resin binder, introduces the possibility of forming voids in which collects the steam during the pressing operation. All such considerations increase the cost of the material and labor going into the manufacture of the panels, but this seemed unavoidable since it is not economically possible to tie up the expensive presses for any considerable period of time in the pressing of the panels, hence a comparatively high temperature and a short pressing period have been employed.

Mention has been made of the dehydration of the panels accompanying their pressing under conditions of temperature and pressure which induce the formation of steam. This, as noted above, leaves the finished panel brittle. It has been mentioned also that a certain amount of moisture is necessary in the veneer as the panels are laid up. This moisture must be regulated within close limits, and it is the practice, in using such resin binders, to condition the veneer prior to laying up the panels, and to condition the finished panels afterward. This conditioning consists in reducing the moisture content below that desired in the veneer, then building it up to the desired point, since it has not been found practicable to reduce the moisture content precisely to that required, but it is easier to reduce it below that point and then to build it up to the point desired. Similarly in conditioning the finished panels which have too little moisture, additional moisture must be supplied. These conditioning steps add to the expense of producing the plywood, and in addition require time, so that it requires approximately two days to complete a panel, taking into consideration the steps of cutting the veneer, conditioning it, laying it up, pressing it, and subsequently conditioning and finishing the panel.

To overcome such difficulties it has been proposed to employ thin sheets, electrically heated, between the panels, but this introduces further or other difficulties. Not only must the whole pile be laid up with more than the usual amount of care, but there is always the danger of short circuiting, of overheating or underheating in different parts, of shocks to workmen; and, because the electrically heated sheets are of necessity thin, so that they have appreciable electrical resistance, and hence can not themselves have any influence to keep the panels from warping. Where a pile of panels must, in effect, keep all panels in the pile flat, without the assistance of inherently stiff plates interspersed between the panels, that is obviously impractical and impossible, especially where there are influences such as steam formation, uneven application of binder, unequal thickness of core veneers, etc., all cumulating to make the panels wavy. Overheating, especially in the interior of the package, is a serious problem, as is also dehydration, in using electrical resistance sheets.

The present process is an improvement on the old processes in the following respects: (1) that no particular conditioning, either of the veneer or of the finished panel, is required, that time is thus saved, and panels can be produced in a few hours; (2) that finishing operations are largely avoided, such as sanding; (3) that the necessity of a large, heavy and expensive press is entirely avoided, and (4) as a result of the above improvements the cost of producing the panel is materially reduced, as is also the expense and deterioration of the necessary equipment for the manufacture of panels, and a better product results.

My invention, therefore, comprises the novel process of manufacturing panels from separate pieces of material, usually of wood or like material containing moisture, with the employment of a binder such as a resin, which sets under heat and pressure, all as shown diagrammatically in the accompanying drawing, and as will be hereinafter disclosed in this specification and more particularly pointed out by the claim which terminates the same.

In the accompanying drawing I have shown, in diagrammatic fashion, the essential steps and conditions of the process, operating upon commercial plywood.

Figure 1 is a diagram in the nature of a side elevation, with parts of certain chambers shown sectionally, illustrating successive steps of my process.

Figure 2 is an elevation of panels arranged or piled for a pressing, showing one arrangement of the panels and the press elements, and Figure 3 is a similar view showing a modified arrangement of the elements.

Commercial plywood may be taken as an illustration of the material to be manufactured, though it will be evident as the specification progresses that other materials might be similarly processed, and I do not desire to be limited as to the character of work performed except as is required by the context of the claim.

Such plywood can be laid up in the usual manner, for example with the bottom face 11, a top face 12, and the core 10, together constituting the panel 1. Especial care need not be taken to avoid interstices in the core or other parts of the panel. Such panels are then piled preferably upon a car 2 having the wheels 21 and 22, and between certain selected panels as thus piled are interposed plates 3 of metal, sufficiently thick and solid to be highly heat-conductive. The particular metal employed is largely immaterial, heat conductivity being the chief consideration, though cheapness, stiffness and strength under compression, and lightness for handling are also considerations. Aluminum would be an ideal material from many standpoints, or iron or steel may be used. The pile is thus continued upward to a considerable height, as panels are piled in the gluing process. When the proper height is reached the pile is compressed by any suitable means; for example rods 4 and turnbuckles 40 connect I-beams 41 and 42 below and above the pile, respectively. Such pressure as is needed upon the pile in pressing is produced by these or equivalent means, so that the whole pile of panels 1 and plates 3 is under sufficient pressure. The binder, it will be understood, is placed between the several plies of the panel in laying it up.

It may be pointed out here that it is not essential that a plate 3 contact each face of a given panel, though this arrangement is shown in Figure 2. In Figure 3 two panels are interposed between each two adjoining plates, and it is not outside the scope of my invention to pile additional panels in contact with each other and to interpose metal plates between every third or fourth panel. The advisability of this depends upon the time and temperature factors in the subsequent step, the thickness of the panels, and like considerations.

The piles thus formed are now supplied with external heat. For instance, they may be surrounded by a heated fluid, as hot air, steam, or even hot water. This may be done in any convenient way, as by rolling the car 2 into a chamber 5 which can be closed, and which is provided with means, illustrated at 50, for supplying within the closed chamber steam, hot air, or the like. A vent at 51 is intended to typify a means for permitting this heated fluid to pass slowly from the chamber, whereby additional heated fluid may be supplied.

Thus surrounded with a heated medium the plates 3 are heated first at their edges, and entirely about the panels, and because of their heat conductivity these plates begin to heat the panels from the edges inwardly. The pile is left in this fashion for a sufficient time to heat the panels at the center, and for a time sufficient to effect setting of the binder at the selected temperature, the whole pile being held meanwhile under pressure. Because the plates are comparatively inexpensive as compared with special presses, it is not uneconomical to permit the pile to remain thus for a considerable period of time. Usually about twenty-five or thirty minutes is sufficient to accomplish setting of the binder in 4 foot by 8 foot panels, although this will depend, as noted above, upon the arrangement of the panels and plates within the pile, upon the temperature in the chamber 5, and like factors.

Because the heating proceeds from the edge inward a further advantage is achieved, namely, that any tendency for the plies to separate in the finished panel at the edges is largely avoided because this part of the panel is first heated and thoroughly heated, and thus the binder is best set adjacent the edges of the panel.

During this heating the temperature is preferably raised to a point above that at which steam forms from the moisture within the panels, but since the whole pile of panels is under pressure, the steam can only escape through the edges of the panels, and if steam is the medium used to heat the pile this tendency is minimized. Indeed, the moisture content of the panels can be increased or maintained, or even decreased, during this step by properly regulating the humidity in the chamber 5 wherein the panels are processed. The dehydration of the panels would occur rapidly were the pressure to be relieved and the panels to be removed from the pile while thus highly heated, as is done in their manufacture in special presses, and especially if such release of pressure occurred in a space wherein the relative humidity was low, but the plates, being comparatively inexpensive, can be provided in large numbers, and are left in place during the cooling.

The cooling can be accomplished merely by removing the pile, still in place upon the car and under pressure, from the heating chamber 5, and allowing it to stand in the open air. It may be accelerated, however, by removing the pile to a second chamber 6, provided with means indicated at 60 for the supply of cold air, and wherein the humidity may be controlled to avoid dehydration of the panels, or indeed cold air may be supplied within the chamber 5 in place of the steam or hot air previously used. While the pile is cooling the pressure is maintained, and the cooling proceeds, as did the heating, from the outside inwardly. Thus all parts of the binder are maintained at elevated temperatures substantially the same period of time, and the edges of the panel, where steam or moisture is likely to depart, are cooled first, retaining the steam within the hotter part, toward the center, and blocking its egress. The panels are cooled to a temperature below that at which steam will form in any part thereof, and any steam which has already formed will again condense, and will distribute itself throughout the panel. At any time after this cooling has been effected the pressure may be relieved, the pile taken down, and the panels are now ready for use, and the plates may be used over again. Because the temperature has been reduced to a point where condensation occurs again within any minute steam pockets, there is no tendency to blow out nor bulge when the pressure is relieved; the conditions producing such results have passed, and as a result the panel, when taken from the pile, is smooth and ready for use, although it is usually desirable to sand at least one face.

It has been proposed, when using special presses provided with steam passages, to pass steam and then cold water through these passages, the steam heating the panels while they are under pressure and the cold water cooling them down, but this entails an economic loss in alternately heating and cooling the press plates. The press cannot in any event be tied up sufficiently to reduced the temperature of the panels below the point where the likelihood of steam formation is present, and there is introduced the further danger of warping or distortion of the expensive press plates, and this method has not been found practical in use. By my method, however, inexpensive plates of metal are employed primarily for their heat conducting characteristics, to convey heat to the interior of the pile, and these, being inexpensive, can be left in place during the entire operation of heating, pressing and cooling the panels.

What I claim as my invention is:

A process of manufacturing panels from materials incorporating a binder setting under heat and pressure, which comprises disposing such materials in side-by-side relation, interposing between selected panels a cool, loose plate of heat-conductive metal which is independent of all other such plates, subjecting all such panels and plates to pressure, thereafter surrounding the panels and plates, while under pressure, with a heated fluid, thus by conduction to heat the plates, and hence the panels, from the edges inwardly, and for a time sufficient to set the binder in the center of each panel, surrounding the panels and plates, while still under pressure, with a cooling fluid, thus by conduction to cool the plates, and hence the panels, and finally releasing the pressure from the cooled panels, after cooling to a degree low enough to prevent formation of steam after such release.

ARTHUR R. WELCH.